(12) United States Patent
Ju et al.

(10) Patent No.: US 12,441,635 B2
(45) Date of Patent: Oct. 14, 2025

(54) LIGHT EMITTING DEVICE

(71) Applicant: SEOUL VIOSYS CO., LTD., Ansan-si (KR)

(72) Inventors: Byeong Cheol Ju, Ansan-si (KR); Jae Young Choi, Ansan-si (KR); Ji Hyun Jo, Ansan-si (KR)

(73) Assignee: SEOUL VIOSYS CO., LTD., Ansan-si (KR)

( * ) Notice: Subject to any disclaimer, the term of this patent is extended or adjusted under 35 U.S.C. 154(b) by 607 days.

(21) Appl. No.: 17/640,977

(22) PCT Filed: Sep. 2, 2020

(86) PCT No.: PCT/KR2020/011750
§ 371 (c)(1),
(2) Date: Mar. 7, 2022

(87) PCT Pub. No.: WO2021/045498
PCT Pub. Date: Mar. 11, 2021

(65) Prior Publication Data
US 2022/0340449 A1 Oct. 27, 2022

(30) Foreign Application Priority Data
Sep. 6, 2019 (KR) .......................... 10-2019-0111037

(51) Int. Cl.
*C02F 1/32* (2023.01)

(52) U.S. Cl.
CPC ...... *C02F 1/325* (2013.01); *C02F 2201/3222* (2013.01); *C02F 2201/326* (2013.01)

(58) Field of Classification Search
CPC .............. C02F 1/325; C02F 2201/3222; C02F 2201/326; C02F 2201/009; C02F 2303/04; C02F 2209/005; C02F 2307/02; C02F 1/30; C02F 2201/3221; C02F 2209/42;
(Continued)

(56) References Cited

U.S. PATENT DOCUMENTS

| | | | |
|---|---|---|---|
| 6,247,827 B1 * | 6/2001 | Carter | B63B 22/166 441/16 |
| 2006/0138443 A1 * | 6/2006 | Fan | H01L 33/56 257/E33.059 |
| 2008/0035581 A1 | 2/2008 | Kuhlmann et al. | |

(Continued)

FOREIGN PATENT DOCUMENTS

| CN | 107151041 A | 9/2017 |
|---|---|---|
| JP | 2001347265 A | 12/2001 |

(Continued)

OTHER PUBLICATIONS

English language machine translation of KR20190098623A, 4 pages, No Date.*

(Continued)

*Primary Examiner* — Pranav N Patel
(74) *Attorney, Agent, or Firm* — Perkins Coie LLP

(57) ABSTRACT

A light emitting device comprises: a body which is arranged on the liquid surface that forms the boundary between air and liquid, and which can move up, down, right, or left in accordance with the floating of the liquid surface; and a light source unit, which is mounted on the body so as to emit light at the liquid, thereby processing the liquid.

20 Claims, 6 Drawing Sheets

(58) Field of Classification Search
CPC .......... A61L 2/10; A61L 2202/14; A61L 2/24; A61L 2202/23
See application file for complete search history.

(56) References Cited

U.S. PATENT DOCUMENTS

| | | | |
|---|---|---|---|
| 2014/0263715 A1* | 9/2014 | Fuller | B05B 17/08 239/18 |
| 2018/0005596 A1 | 1/2018 | Zeng | |
| 2018/0055960 A1 | 3/2018 | Reiber et al. | |
| 2019/0262493 A1 | 8/2019 | Collins et al. | |
| 2019/0263680 A1* | 8/2019 | Dobrinsky | A61L 2/24 |

FOREIGN PATENT DOCUMENTS

| KR | 10-2016-0072393 A | 6/2016 |
|---|---|---|
| KR | 10-2017-0036173 A | 4/2017 |
| KR | 20170036173 A | 4/2017 |
| KR | 10-1816443 A | 1/2018 |
| KR | 101816443 B1 | 1/2018 |
| KR | 20190098623 A | 8/2019 |

OTHER PUBLICATIONS

Search Report from corresponding European Patent Application No. 20861205, dated Jul. 14, 2023 (8 pages).
International Search Report mailed Dec. 11, 2020 for International Patent Application No. PCT/KR2020/011750.
Office Action from corresponding related Chinese Application No. 202080073867.3, dated Mar. 25, 2024, (10 pages).
Office Action from corresponding related Indian Patent Application No. 202217011323, dated Feb. 21, 2025.
Office Action from corresponding related Korean Patent Application No. 10-2019-0111037, dated Jan. 7, 2025.

* cited by examiner

[FIG. 10]
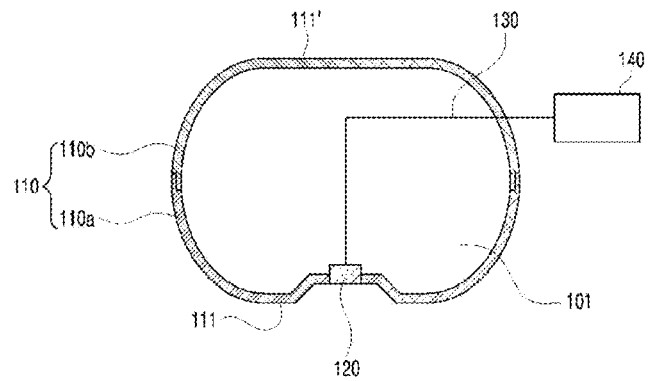
[FIG. 11]
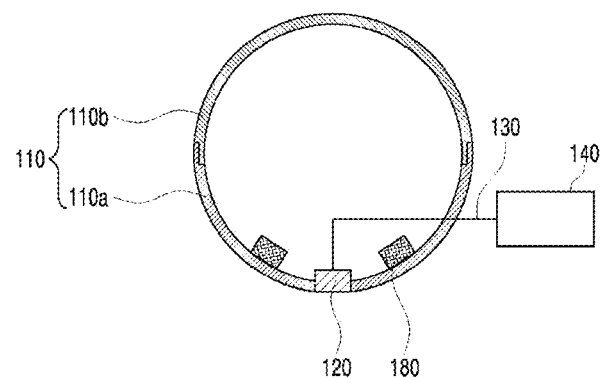
[FIG. 12]
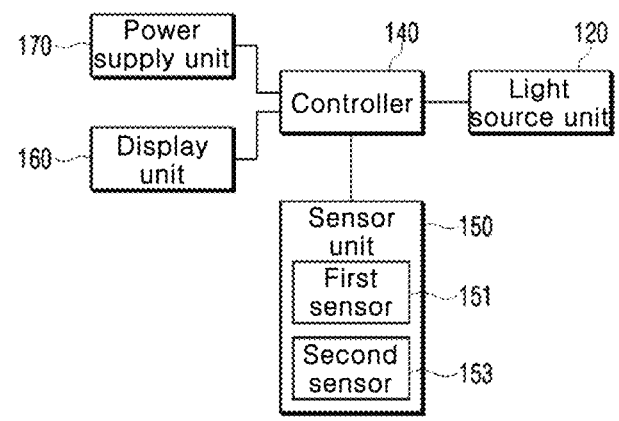

LIGHT EMITTING DEVICE

This patent document is a 371 National Phase Application of International Patent Application No. PCT/KR2020/011750, filed Sep. 2, 2020, which further claims priority to Korean Patent Application No. 10-2019-0111037, filed Sep. 6, 2019. The entire contents of the above noted applications are incorporated by reference as part of the disclosure of this document.

TECHNICAL FIELD

Embodiments of the present disclosure relate to a light emitting device and, more particularly, to a water treatment device.

BACKGROUND

Recently, with increase in environmental pollution due to industrialization, more and more people care about environmental problems as well as their wellbeing. Accordingly, there is increasing demand for clean water or clean air, and thus various related products that can provide clean water and clean air, such as a water treatment device, an air purifier, and the like, are being developed.

However, there is no simple way to obtain clean water in a region that frequently suffers from water pollution and still lacks large-scale water purification facilities. Therefore, there is a need for related products.

DISCLOSURE

Technical Problem

Embodiments of the present disclosure are aimed at providing a light emitting device that efficiently treats water at a low cost.

Technical Solution

In accordance with one aspect of the present disclosure, there is provided a light emitting device including: a main body disposed on a liquid surface forming a boundary between air and a liquid and movable vertically and laterally in response to movement of the liquid surface; and a light source unit mounted on the main body and emitting light toward the liquid to treat the liquid, wherein the light source unit includes a light emitting diode including semiconductor layers doped with different conductivity types of dopants and an active layer interposed between the semiconductor layers.

In one embodiment, the light source unit may have a light exit surface substantially parallel to the liquid surface, assuming the liquid surface is stationary.

In one embodiment, the light exit surface of the light source unit may directly contact the liquid surface or may contact the liquid surface with the air interposed therebetween, assuming the liquid surface is stationary.

In one embodiment, the main body may include an outer wall having a space in an interior thereof, wherein the interior may be filled with a material having a lower specific gravity than the liquid.

In one embodiment, the material having a lower specific gravity than the liquid may be air.

In one embodiment, the main body may include a first piece and a second piece fastened to each other to define the interior, wherein the first piece may be disposed closer to the liquid surface than the second piece.

In one embodiment, the light emitting device may further include: a weight disposed inside the main body such that the light emitting device has a center of gravity at a location below half a height from the liquid surface to an uppermost portion of the main body. In one embodiment, the weight may be disposed on the first piece.

In one embodiment, the light source unit may correspond to the weight.

In one embodiment, the main body may have a flat portion formed in a substantially flat shape at a portion of the main body meeting the liquid surface.

In one embodiment, the flat portion may contact the liquid surface and may be substantially parallel to the liquid surface, assuming the liquid surface is stationary.

In one embodiment, the light source unit may include: the light emitting diode emitting the light; and a controller controlling an amount of the light emitted from the light emitting diode. In one embodiment, the light emitting device may further include: a sensor unit connected to the controller, the sensor unit including at least one of a first sensor detecting an amount of the liquid and a second sensor detecting tilting of the main body or contact of the main body with the liquid.

In one embodiment, the liquid may be contained in a water storage tank; the first sensor may be a detection sensor detecting a height from a bottom surface of the water storage tank to the liquid surface; and the controller may control the amount of the light emitted from the light source unit based on information from the detection sensor.

In one embodiment, the second sensor may be a tilting sensor detecting a degree of tilting of the main body; and the controller controls On/Off of the light source unit based on the degree of tilting of the main body.

In one embodiment, the light emitting device may further include: a display unit connected to the controller and displaying whether the light source unit is in an On state or in an Off state.

In one embodiment, the light source unit may include: a substrate; the light emitting diode mounted on the substrate and emitting the light; and a transmissive window transmitting the light emitted from the light emitting diode therethrough, wherein the transmissive window may form the light exit surface.

In one embodiment, the light emitting device may further include: a power supply unit supplying power to the light source unit, wherein the power supply unit may be a solar cell or a battery.

In one embodiment, the light may have a wavelength of 100 nm to 430 nm.

In accordance with another aspect of the present disclosure, there is provided a light emitting device including: a main body disposed on a liquid surface forming a boundary between air and a liquid, the main body having a lower specific gravity than the liquid; and a light source unit mounted on the main body and emitting light toward the liquid to treat the liquid, wherein the light source unit includes a light emitting diode including semiconductor layers doped with different conductivity types of dopants and an active layer interposed between the semiconductor layers.

Advantageous Effects

Embodiments of the present disclosure provide a light emitting device that efficiently treats water at a low cost.

BRIEF DESCRIPTION OF THE DRAWINGS

FIG. 9 to FIG. 11 are sectional views of water treatment devices according to other embodiments of the present disclosure.

FIG. 12 is a block diagram of a water treatment device according to one embodiment of the present disclosure.

DETAILED DESCRIPTION

Figure 1:
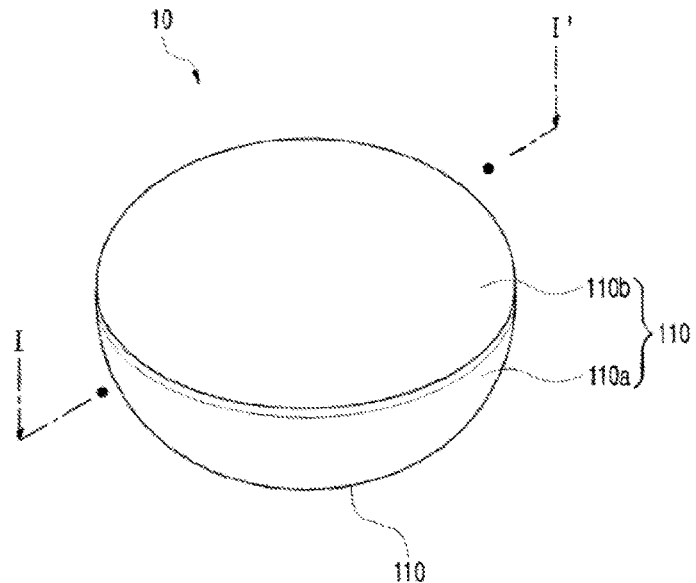
FIG. 1 is a perspective view of a water treatment device according to one embodiment of the present disclosure.

The present disclosure may be realized by various embodiments and some exemplary embodiments of the present disclosure will be described in detail with reference to the accompanying drawings. However, it should be understood that the present disclosure is not limited to the following embodiments, and that various modifications, substitutions, and equivalent embodiments can be made by those skilled in the art without departing from the spirit and scope of the present disclosure.

Like components will be denoted by like reference numerals throughout the specification. It should be noted that the drawings may be exaggerated in thickness of lines or size of components for descriptive convenience and clarity only. It will be understood that, although the terms "first", "second", "A", "B", and the like may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element or component discussed below could also be termed a second element or component, or vice versa, without departing from the scope of the present disclosure. As used herein, the singular forms "a", "an", and "the" are intended to include the plural forms as well, unless the context clearly indicates otherwise.

It will be understood that the terms "includes", "comprises", "including" and/or "comprising," when used in this specification, specify the presence of stated features, steps, operations, elements, and/or components, but do not preclude the presence or addition of one or more other features, steps, operations, elements, components, and/or groups. In addition, when a layer, film, region, or panel is referred to as being "on" another layer, film, region, or panel, it may be directly on the other layer, film, region, or panel, or intervening layers, films, regions, or panels may be present. In addition, when a layer, film, region, or panel is referred to as being "formed on" another layer, film, region, or panel, it may be formed on an upper, lower, or side surface of the other layer, film, region, or panel. Further, when a layer, film, region, or panel is referred to as being "under" another layer, film, region, or panel, it may be directly under the other layer, film, region, or panel, or intervening layers, films, regions, or panels may be present.

Hereinafter, exemplary embodiments of the present disclosure will be described in detail with reference to the accompanying drawings.

One embodiment of the present disclosure relates to a light emitting device and, more particularly, to a device for treating a liquid. Here, the liquid may be water, oil, or the like, particularly water. In one embodiment, treatment of the liquid performed by the light emitting device includes, for example, sterilization, purification, and deodorization of the liquid. The present disclose will now be described by way of an example in which the light emitting device is used as a device for treating a liquid, particularly water, that is, a water treatment device. Here, the water to be treated may be, for example, water contained in a water storage tank. However, it will be understood that the present disclosure is not limited thereto and the light emitting device according to the embodiment of the present disclosure may also be used to treat a predetermined volume of water not contained in a water storage tank depending on circumstances.

Figure 2:
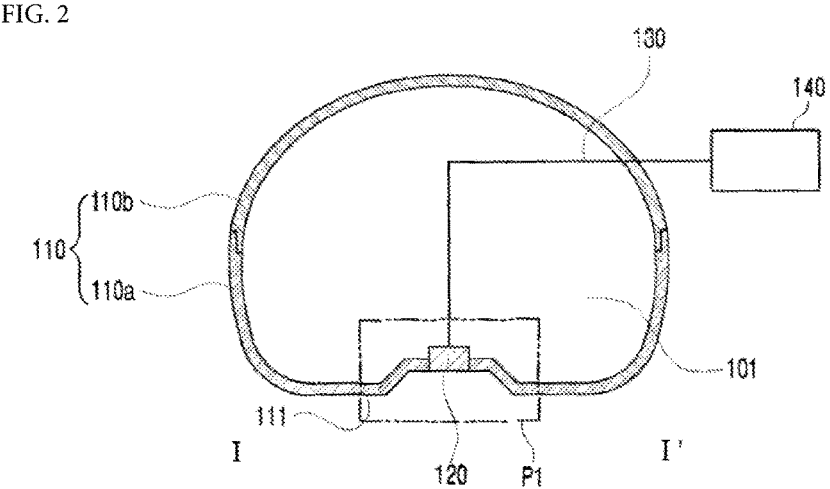
FIG. 2 is a sectional view taken along line I-I' of FIG. 1.

FIG. 1 is a perspective view of a water treatment device according to one embodiment of the present disclosure. FIG. 2 is a sectional view taken along line I-I' of FIG. 1.

Figure 3:
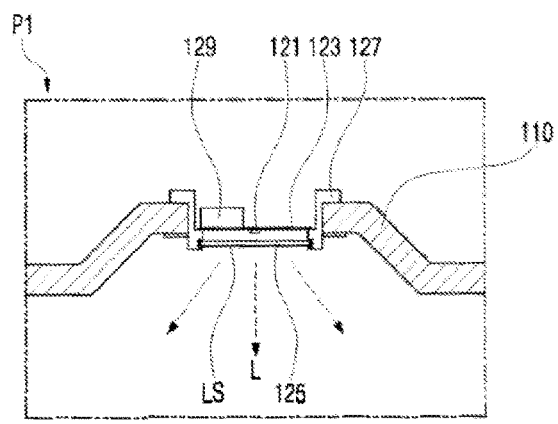
FIG. 3 is an enlarged sectional view of portion P1 of FIG. 2.
Figure 4:
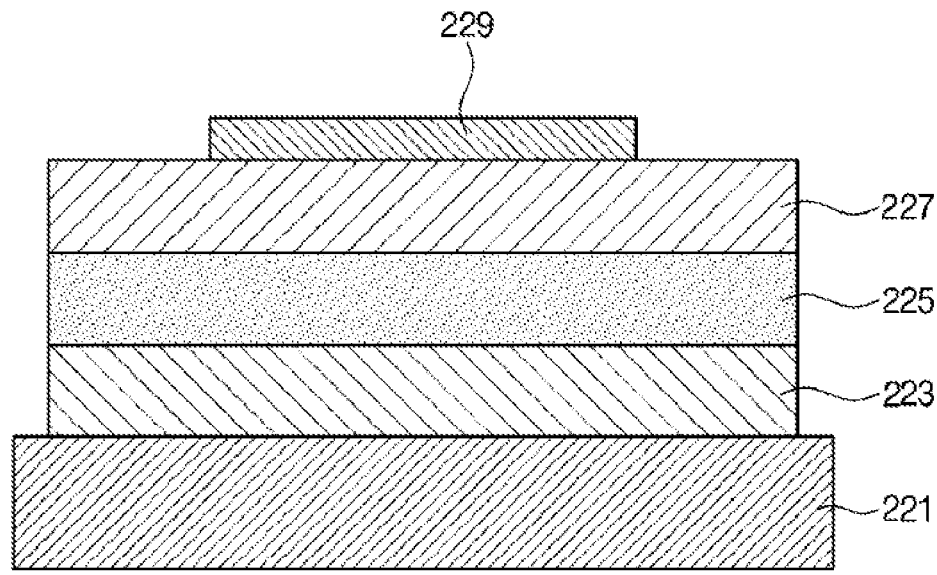
FIG. 4 is a schematic view of a light emitting diode of FIG. 3.

FIG. 3 is an enlarged sectional view of portion P1 of FIG. 2. FIG. 4 is a schematic view of a light emitting diode of FIG. 3.

Referring to FIG. 1, FIG. 2, and FIG. 3, the water treatment device 10 according to this embodiment includes a main body 110 and a light source unit 120 mounted on the main body 110 and emitting light for treatment of water.

The main body 110 is disposed on a water surface and has buoyancy to float on water. To this end, the main body 110 may be generally provided in the form of a buoy assembled from multiple pieces.

The main body 110 includes an outer wall having a space in an interior 101 thereof. Here, the interior 101 may be filled with a material having a lower specific gravity than the water such that the entire water treatment device 10 can have buoyancy. In addition, the water treatment device 10 may be generally formed of a material having a lower density than the water. Here, the material having a lower specific gravity than the water may be air and the main body 110 may be formed of a polymer resin having a lower specific gravity than the water. For example, the material having a lower density than the water, which forms the water treatment device 10, may be porous Styrofoam.

The main body 110 may consist of multiple pieces which are fastened to one another to define the interior 101. The main body 110 assembled from the multiple pieces may have any overall shape that allows the main body 110 to float on the water, without limitation. For example, the main body 110 may include a first piece 110a and a second piece 110b fastened to each other to define the interior 101. The main body 110 may generally have a circular shape in plan view and a shape of a sphere flattened at a bottom thereof in side view. Here, the first piece 110a and the second piece 110b may correspond to two portions resulting from transversely cutting the sphere flattened at the bottom thereof, respectively.

The multiple pieces may be fastened to one another in various forms that allow sealing of the interior 101. For example, when the main body 110 consists of the first piece 110a and the second piece 110b, one of the first piece 110a and the second piece 110b may have a protrusion and the other one may have a groove corresponding to the protrusion such that the first piece 110a and the second piece 110b can be engaged with and fastened to each other. Alternatively, the first portion 110a and the second portion 110b may be partially formed therethrough with respective coupling holes facing each other such that the first piece 110a and the second piece 110b can be fastened to each other with a screw passing through the coupling holes.

In one embodiment, the multiple pieces may be disposed such that the interior 101 defined thereby has a watertight structure. To this end, a sealing member may be disposed between the multiple pieces. For example, in one embodiment, the sealing member may be disposed between the first piece 110a and the second piece 110b.

The sealing member is formed in the shape of a closed figure. In this way, the sealing member disposed between the first and second pieces 110a, 110b upon fastening the first and second pieces 110a, 110b to each other can tightly fasten the first and second pieces 110a, 110b to each other without leaving an empty space between the first and second pieces 110a, 110b while isolating and sealing the interior 101 from the outside. To this end, for example, the sealing member may be provided in the form of an O-ring.

The sealing member may be formed of a soft elastic material. When the sealing member is formed of an elastic material, the sealing member is compressed against the first and second pieces 110a, 110b upon fastening the first and second pieces 110a, 110b to each other, thereby maintaining a tight fastening structure.

Although the elastic material forming the sealing member may be, for example, a silicone resin, it will be understood that the present disclosure is not limited thereto and the sealing member may be formed of other materials. For example, the elastic material forming the sealing member may include natural rubber, synthetic rubber, or any other elastic organic polymer materials.

In one embodiment, the shape and fastening structure of the first portion 110a and the second portion 110b may be varied as necessary. In one embodiment, the first piece 110a may correspond to a portion disposed closer to the water surface 11 and the second portion 110b may correspond to a portion disposed father from the water surface 11.

Figure 5:
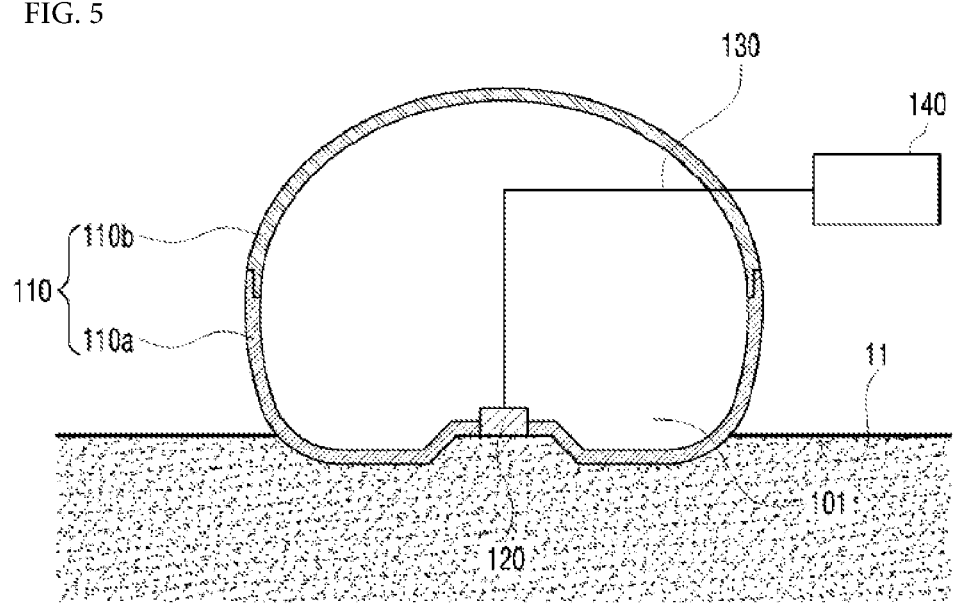
FIG. 5 is a sectional view of the water treatment device 10 according to the embodiment, wherein the water treatment device 10 is disposed on the water surface.

FIG. 5 is a sectional view of the water treatment device 10 according to the embodiment of the present disclosure, wherein the water treatment device 10 is disposed on the water surface 11.

Referring to FIG. 1, FIG. 2, FIG. 3, and FIG. 5, the water treatment device 10 according to the embodiment of the present disclosure can float on the water surface 11 since the water treatment device 10 has the interior 101 having a lower specific gravity than the water.

In one embodiment, the first piece 110a may have a flat portion 111 on a side thereof contacting the water surface 11 such that the water treatment device can be stably disposed on the water surface 11. The flat portion 111 may generally have a planar shape and may be substantially parallel to the water surface 11 when the main body 110 is disposed on the water surface 11. Since the water is a fluid, the water surface 11 continuously moves and is thus not completely flat. However, when there is no external force applied to the water, the water surface 11 can be substantially flat. In this case, when the flat portion 111 contacts the water surface 11, the flat portion 111 is disposed substantially parallel to the water surface 11. Assuming there is no external force causing the water surface 11 to move regardless of whether the water surface 11 actually moves or not, the flat portion 111 is disposed substantially parallel to the water surface 11.

The light source unit 120 is mounted on the main body 110. The light source unit 120 is mounted on the bottom of the main body 110 to emit light L in a downward direction from the surface of water 11. Since the first piece 110a is disposed closer to the water surface 11, the light source unit 120 is mounted on the first piece 110a in one embodiment of the present disclosure.

The light source unit 120 delivers light L suitable for treating the water to the water. The light source unit 120 is disposed at various locations adjacent to the water and emits the light to treat (for example, sterilize, purify, and deodorize) the water. In one embodiment, the light L is germicidal light. For example, the light L may be UV light or light in a wavelength band near the UV range, for example, blue light near the UV range. In one embodiment, the light L may have a wavelength of about 100 nm to about 430 nm.

The light source unit 120 may include a substrate 123, a light emitting diode 121 mounted on the substrate 123 and emitting the light L, and a transmissive window 125 transmitting the light emitted from the light emitting diode 121 therethrough.

FIG. 4 is a schematic view of the light emitting diode according to one embodiment of the present disclosure.

Referring to FIG. 4, the light emitting diode may include: a light emitting structure including a first semiconductor layer 223, an active layer 225, and a second semiconductor layer 227; and a first electrode 221 and a second electrode 229 connected to the light emitting structure.

The first semiconductor layer 223 is a semiconductor layer doped with a first conductivity type dopant. The first conductivity type dopant may be a p-type dopant. The first conductivity type dopant may include Mg, Zn, Ca, Sr, Ba, and the like. In one embodiment, the first semiconductor layer 223 may be formed of a nitride-based semiconductor. In one embodiment, the first semiconductor layer 223 may be formed of a material including GaN, AlN, AlGaN, InGaN, InN, InAlGaN, AlInN, and the like.

The active layer 225 is disposed on the first semiconductor layer 223 and corresponds to a light emitting layer. Specifically, the active layer 225 is a layer in which electrons (or holes) injected through the first semiconductor layer 223 and holes (or electrons) injected through the second semiconductor layer 227 recombine to emit light due to a bandgap difference between energy bands of a material forming the active layer 225.

The active layer 225 may be implemented by a compound semiconductor. For example, the active layer 225 may be implemented by at least one selected from among group III-V compound semiconductors or group II-VI compound semiconductors.

The second semiconductor layer 227 is disposed on the active layer 225. The second semiconductor layer 227 is a semiconductor layer doped with a second conductivity type dopant having an opposite polarity to the first conductivity type dopant. The second conductivity type dopant may be an n-type dopant. For example, the second conductivity type dopant may include Si, Ge, Se, Te, O, C, and the like.

In one embodiment, the second semiconductor layer 227 may be formed of a nitride-based semiconductor. For example, the second semiconductor layer 227 may be formed of a material including GaN, AlN, AlGaN, InGaN, InN, InAlGaN, AlInN, and the like.

The first electrode 221 and the second electrode 229 may be provided in various forms to be connected to the first semiconductor layer 223 and the second semiconductor layer 227, respectively. Although the first electrode 221 and the second electrode 229 are shown as disposed on a lower surface of the first semiconductor layer 223 and an upper surface of the second semiconductor layer 227, respectively, in this embodiment, it will be understood that the present disclosure is not limited thereto. In one embodiment, the first electrode 221 and the second electrode 229 may be formed of, for example, various metals, such as Al, Ti, Cr, Ni, Au, Ag, Ti, Sn, Ni, Cr, W, and, Cu, or alloys thereof. Each of the first electrode 221 and the second electrode 229 may be formed in one or multiple layers.

Although the light emitting diode is described as being a vertical light emitting diode, it will be understood that the light emitting diode does not necessarily have to be a vertical light emitting diode and may include various other types of light emitting diodes without departing from the spirit of the present disclosure.

As in the embodiment, use of the light emitting diode as a light source applying light to a sample provides the following advantages over use of typical lamps.

When the light emitting diode is used as the light source as in the embodiment, it is possible to treat water using light having a specific wavelength unlike when typical lamps (for example, UV lamps) are used. Light emitted from typical lamps has a broader spectrum than light emitted from the light emitting diode. Thus, it is difficult to separate a light component in a specific wavelength band from light emitted from typical lamps. Conversely, light emitted from the light emitting diode has a spectrum with a sharp peak at a specific wavelength, and thus the light emitting diode can provide a specific wavelength of light with a much narrower full width at half maximum than light emitted from typical lamps. Accordingly, the light emitting diode can be advantageously used to selectively provide only light having a specific wavelength needed for treatment of water. As a result, it is possible to freely choose either light in a broad spectrum or light having a specific wavelength, as needed.

In addition, typical lamps have difficulty in delivering light to a sample at a clearly defined irradiance, whereas the light emitting diode can deliver light at a clearly defined irradiance. Further, since typical lamps have difficulty in delivering light at a clearly defined irradiance, it is necessary to set a broad irradiation time range. Conversely, the light emitting diode can provide light required for a sample within a relatively short and clearly defined timeframe.

As described above, typical lamps have difficulty in delivering an accurate dose of radiation due to a relatively broad wavelength band, a relatively broad irradiance range, and a relatively broad irradiation time range thereof. Conversely, the light emitting diode can deliver an accurate dose of radiation due to a relatively narrow wavelength band, a relatively narrow irradiance range, and a relatively narrow irradiation time range thereof.

In addition, typical lamps take a considerable amount of time to reach a maximum irradiance thereof after being powered on. Conversely, the light emitting diode requires little or no warm-up time and can reach a maximum irradiance thereof immediately after being powered on. Thus, when the light emitting diode is used, it is possible to precisely control the duration of delivery of light having a specific wavelength to water.

Referring back to FIG. 1, FIG. 2, FIG. 3, and FIG. 5, the substrate 123 may be provided in various forms and may have a disc-like shape in plan view to correspond in shape to the first piece 110a. However, it will be understood that the present disclosure is not limited thereto and the substrate 123 may have various other shapes.

At least one light emitting diode 121 may be mounted on the substrate 123. For example, the light emitting diode 121 may include multiple light emitting diodes, which may be arranged in a predetermined direction on the substrate 123. In one embodiment, the substrate 123 may be provided on a back surface thereof with a battery 129 to supply power to the light emitting diode 121.

When the light source unit 120 includes multiple light emitting diodes 121, the multiple light emitting diodes 121 may emit light in the same wavelength band, or may emit light in different wavelength bands. For example, in one embodiment, all the multiple light emitting diodes 121 may emit UV light having the same or similar wavelength or light L in a wavelength band near the UV range. In another embodiment, some light emitting diodes 121 may emit light in a certain wavelength band within the UV range and the other light emitting diodes 121 may emit light in another wavelength band within the UV range. Alternatively, there may be some light emitting diodes 121 emitting blue light near the UV range.

When the multiple light emitting diodes 121 emit light in different wavelength bands, the multiple light emitting diodes 121 may be arranged in various orders. For example, a light emitting diode 121 emitting light in a first wavelength band and a light emitting diode 121 emitting light in a second wavelength band different from the first wavelength band may be alternately arranged.

The light L emitted from the light source unit 120 may have various wavelengths. The light from the light source unit 120 may be light in the visible range, the infrared range, or other wavelength ranges. In one embodiment, a wavelength of the light emitted from the light source unit 120 may be varied depending on the type of water to be treated, or the type of targets to be killed (germs, bacteria, and the like). In particular, for sterilization of water, the light from the light source unit 120 may have a germicidal wavelength. For example, the light source unit 120 may emit UV light and light in a wavelength band near the UV range. In one embodiment, the light source unit 120 may emit light in a wavelength band of about 100 nm to about 430 nm, which is a wavelength band capable of killing microorganisms and the like. In one embodiment, the light source unit 120 may emit light in a wavelength band of about 100 nm to about 300 nm. In another embodiment, the light source unit 120 may emit light in a wavelength band of 180 nm to about 280 nm. In a further embodiment, the light source unit 120 may emit light in a wavelength band of about 250 nm to about 260 nm. UV light in the wavelength bands described above and light in a wavelength band near the UV range have high germicidal capacity. For example, exposure to UV light with an intensity of 100 μW/cm$^2$ can kill up to about 99% of bacteria, such as *Escherichia coli, Bacillus diphtheriae*, and *Bacillus dysenteriae*. In addition, UV light in the wavelength bands described above can kill bacteria that cause food poisoning, such as pathogenic *Escherichia coli, Staphylococcus aureus, Salmonella* Weltevreden, *S. Typhimurium, Enterococcus faecalis, Bacillus cereus, Pseudomonas aeruginosa, Vibrio parahaemolyticus, Listeria monocytogenes, Yersinia enterocolitica, Clostridium perfringens, Clostridium botulinum, Campylobacter jejuni*, and *Enterobacter sakazakii*.

Although not shown in the drawings, the water treatment device 10 according to the embodiment may further include a controller 140 connected to the light source unit 120 and an interconnect 130 connecting the controller 140 to the light source unit 120.

The controller 140 controls operation of the light source unit 120, the amount and intensity of the light emitted from the light source unit 120, and the duration of light emission from the light source unit 120, and the like. The controller 140 may control operation of the light source unit 120, the amount and intensity of the light emitted from the light source unit 120, and the duration of light emission from the light source unit 120 in various ways.

In this embodiment, when the light source unit 120 includes multiple light emitting diodes 121, the controller 140 controls the light emitting diodes 121 to operate either simultaneously or individually. That is, the multiple light emitting diodes 121 of the light source unit 120 may be turned on/off at the same time, or may be turned on/off separately from one another. In addition, emission intensities of the light sources may also be controlled either simultaneously or individually.

In one embodiment, a distance from the light emitting diodes to a treatment object may be set to various values. For example, the distance from the light sources to the treatment object may be varied depending on the emission intensity of the light source unit, the types of treatment object, the area or volume to be sterilized, the types of target to be killed (for example, germs, bacteria, and the like), and the like. In one embodiment, the duration of light emission from the light sources may also be set to various values in a similar manner.

As described above, the light source unit 120 further includes the transmissive window 125 transmitting light emitted from the light emitting diode 121 therethrough. The transmissive window 125 is disposed between the light emitting diode 121 of the light source unit 120 and the water. The transmissive window 125 serves to protect the substrate 123 and the light emitting diode 121 and may be formed of a transparent insulating material. However, it will be understood that the present disclosure is not limited thereto and the transmissive window 125 may be formed of various other materials. For example, the transmissive window 125 may be formed of quartz or an organic polymer material. Since a wavelength absorbed/transmitted by/through the organic polymer material depends on the type of monomers used, the method used to form the organic polymer material, and the condition in which the organic polymer material is formed, the organic polymer material may be selected in consideration of emission wavelengths of the light sources. For example, organic polymers such as poly(methyl methacrylate) (PMMA), polyvinyl alcohol (PVA), polypropylene (PP), and low-density polyethylene (PE) absorb little or no UV light, whereas organic polymers such as polyester can absorb UV light.

The transmissive window 125 prevents intrusion of moisture into the interior 101 of the main body 110 while transmitting the light emitted from the light source unit 120 therethrough. To this end, the transmissive window 125 may be formed of a material impermeable to moisture and may closely contact the main body 110. For example, the transmissive window 125 may be at least partially inserted into an inner surface of the main body 110 to prevent intrusion of moisture through a gap between the transmissive window 125 and the main body 110.

An outer surface of the transmissive window 125 may directly contact the water when the water treatment device 10 is disposed on the water surface 11. That is, the outer surface of the transmissive window 125 corresponds to a portion directly contacting the water. Alternatively, the transmissive window 125 may not directly contact the water. In this case, the transmissive window 125 may be disposed adjacent to the water with air interposed therebetween.

The light emitted from the light emitting diode 121 of the light source unit 120 travels towards the water through the transmissive window 125. Here, an interface between the transmissive window 125 and the water corresponds to a light exit surface LS, that is, a surface through which the light L exits the light source unit.

In one embodiment, the main body 110 may have a stepped portion recessed in the direction of the interior 101 of the main body 110 in a region in which the transmissive window 125 is disposed. In addition, the main body 110 may have an opening corresponding in shape to the transmissive window 125. The opening may have a diameter that allows the light emitted from the light source unit 120 to completely exit the main body 110 without being blocked by the main body 110. The diameter of the opening may depend on a directional angle of the light source unit 120.

The opening may have a circular shape in plan view, whereby the light emitted from the light source unit 120 can radially exit the main body 110 without being blocked by the main body 110.

The main body 110 may include a support 127 supporting the transmissive window 125 and the light source unit 120 and securing the transmissive window 125 and the light source unit 120 to the main body 110. In addition, the support 127 may secure a space between the light source unit 120 and the transmissive window 125. The support 127 may be fastened to the main body 110 in various manners. For example, the support 127 may be fastened to the main body 110 by thread engagement. In one embodiment, the support portion 127 may have any suitable shape, without limitation.

The water treatment device 10 having the structure described above is disposed on the water surface 11 forming a boundary between air and the water and is movable vertically and laterally in response to movement of the water surface 11. Since the water treatment device 10 according to the embodiment of the present disclosure is disposed on the water surface 11, the water treatment device 10 can maintain a very close distance to the water to be treated. When the water is treated with the light, water treatment efficiency varies depending on the distance between the water and the light source unit 120. However, the water treatment device 10 according to the embodiment of the present disclosure can achieve both increase in water treatment efficiency and reduction in treatment time by minimizing the distance between the water and the light source unit 120.

Figure 6:
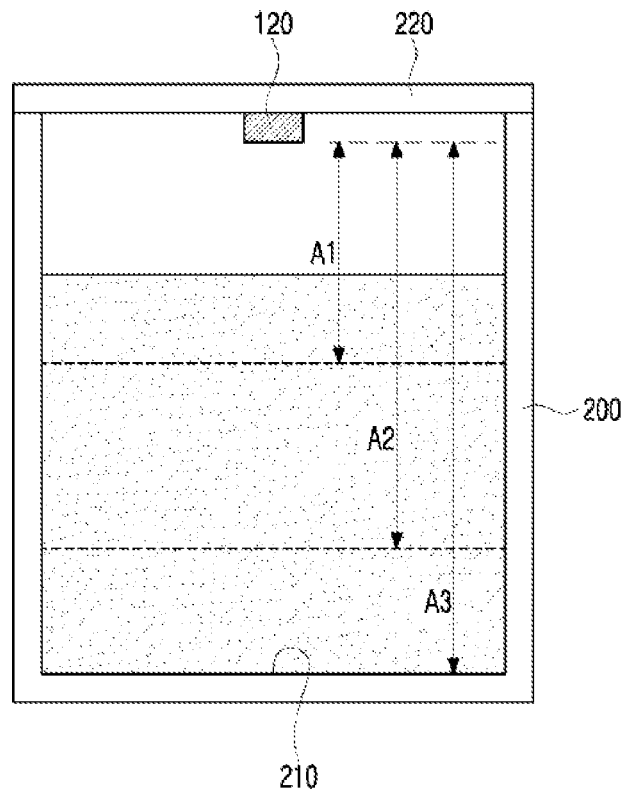
FIG. 6 to FIG. 8 are conceptual views illustrating sterilization efficiency of the water treatment device according to the embodiment.
Figure 7:
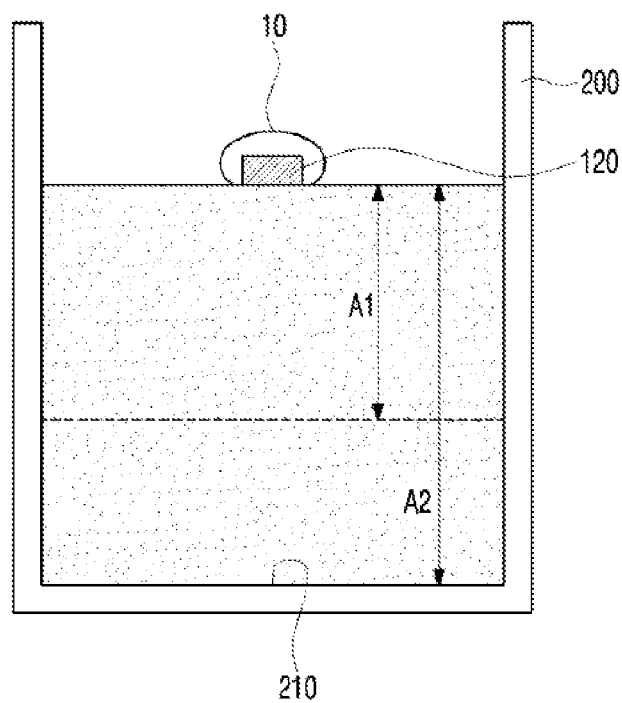
Figure 8:
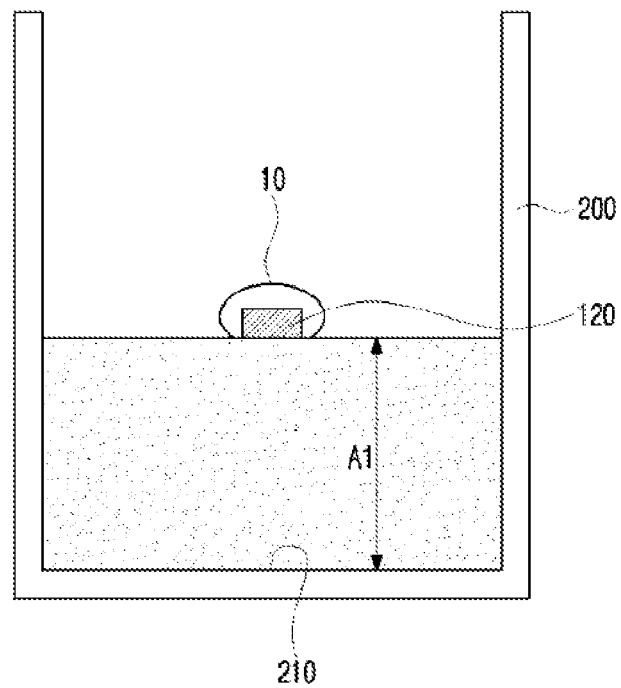

FIG. 6 to FIG. 8 are conceptual views illustrating sterilization efficiency of the water treatment device according to the embodiment of the present disclosure. FIG. 6 shows a conventional water treatment device and FIG. 7 and FIG. 8 show the water treatment device according to the embodiment of the disclosure. In FIG. 7 and FIG. 8, different amounts of water are contained in a water storage tank. Specifically, in FIG. 7, the water storage tank contains a larger amount of water than in FIG. 8.

In the water treatment device according to the embodiment, the light source unit 120 has a water treatment region in which effective treatment of the water is achieved through delivery of the light for a predetermined of period of time. More specifically, the water treatment region is a region in which a desired level of water treatment can be achieved through sufficient supply of the light from the light source unit 120 to the water. For example, when the water treatment device is used to sterilize the water, the water treatment region may refer to a region in which a sterilization efficiency of 99%, 99.9%, or 99.99% is achieved through supply of the light from the light source unit 120 for a predetermined period of time.

At a given emission intensity of the light source unit 120 of the water treatment device, a depth of the water treatment region depends on duration of light emission. With increasing duration of light emission, the area of the water treatment region increases, thereby allowing the water to be treated to a greater depth.

A conventional water treatment device, for example, the water treatment device of FIG. 6, includes a light source unit 120 mounted on a lid 220 of a water storage tank 200 containing water to be treated.

Referring to FIG. 6, for a given emission intensity of the light source unit 120, a depth of the water treatment region corresponding to treatment for a first period of time is referred to as a first depth A1, a depth of the water treatment region corresponding to treatment for a second period of time is referred to as a second depth A2, and a depth of the water treatment region corresponding to treatment for a third period of time is referred to as a third depth A3. If the first depth A1<the second depth A2<the third depth A3, then the first period of time<the second period of time<the third period of time.

In the water treatment device of FIG. 6, the light source unit 120 is spaced apart from the water with air interposed therebetween since the light source unit 120 is mounted on the lid 220 of the water storage tank 200. Accordingly, for example, the water treatment region corresponding to treatment with the light from the light source unit 120 for the first period of time is a region up to the first depth A1, which includes a region in which air is present. Accordingly, only an upper portion of the water up to the first depth A1 is treated for the first period of time. In addition, the water is treated up to the second depth A2 for the second period of time and is treated up to the third depth A3 for the third period of time.

Referring to FIG. 7, the water treatment device according to the embodiment is disposed directly on the water surface rather than on the lid 220 of the water storage tank 200. Accordingly, the water treatment region up to the first depth A1, in which treatment of the water can be achieved through delivery of the light from the light source unit 120, corresponds to a region filled with only the water without air. Accordingly, at a given emission intensity for a given period of time (for example, for the first period of time), the water treatment device of FIG. 7 can treat a significantly larger amount of water than the water treatment device of FIG. 6. In other words, the water treatment device of FIG. 7 can shorten the time required for treating a given amount of water, as compared with the water treatment device of FIG. 6, thereby improving water treatment efficiency.

Referring to FIG. 8, since the water treatment device according to the embodiment is disposed directly on the water surface rather than on the lid 220 of the water storage tank 200, the water treatment device is movable vertically and laterally according to the location of the water surface. Accordingly, as the distance from the water surface 11 to a bottom surface 210 of the water storage tank 200 decreases, there is a higher possibility of the water treatment region encompassing the entirety of the water in the water storage tank within a predetermined period of time, for example, within the first period of time, whereby the time required for treating the water can be shortened. That is, the time required for treating water decreases with decreasing amount of the water.

The conventional water treatment device, in which the light source unit 120 is disposed at a specific fixed location as shown in FIG. 6, takes the same amount of time to treat water regardless of the amount of the water. That is, regardless of the amount of water and the height of the water surface, the conventional water treatment device needs to emit light for the third period of time to treat the entirety of the water. Conversely, the water treatment device according to the present disclosure, in which the light source unit 120 is disposed on the water surface as shown in FIG. 7 or FIG. 8, requires a smaller amount of time to treat a smaller amount of water.

The conventional water treatment device of FIG. 6 is supplied in a state of being mounted on the lid 220 or at another location of the water storage tank 200. Accordingly, when failure occurs in any one component of the water storage tank 200 or the water treatment device, the entire water storage tank 200 or the entire lid 220 needs to be replaced. Conversely, the water treatment device according to the embodiment of the present disclosure is supplied as a separate structure rather than being mounted on the water storage tank 200, and it is thus sufficient to replace only the water treatment device when a problem occurs in the water treatment device itself.

According to one embodiment, it is possible to treat (for example, sterilize) water, simply by placing the water treatment device on the water after turning the light source unit on without requiring complicated manipulation.

In many regions, it is common that water for drinking is first stored in a water storage tank before use. However, there is a risk of microorganisms proliferating in the stored water. Particularly, in a region with high average temperatures such as some regions of Africa, microorganisms are more likely to proliferate very rapidly.

In addition, since the water treatment device according to the embodiment has a simple structure consisting of the main body and the light source unit, the water treatment device can be manufactured as a small-sized portable device. Accordingly, regardless of where water is stored, the water can be sterilized to be used as drinking water simply by disposing the water treatment device according to the present embodiment on the surface of the water.

Further, since the water treatment device according to the embodiment has a simple structure consisting of the main body and the light source unit, the water treatment device is easy to manufacture and also costs less to manufacture. Accordingly, the water treatment device according to the embodiment of the present disclosure is readily available to even low-income people in underdeveloped countries, who suffer frequent water pollution and still cannot afford to purchase an expensive water treatment device.

The water treatment device according to the embodiment can be modified in various forms. In the following embodiments, differences from the above embodiment will be mainly described in order to avoid duplication of description.

Figure 9:
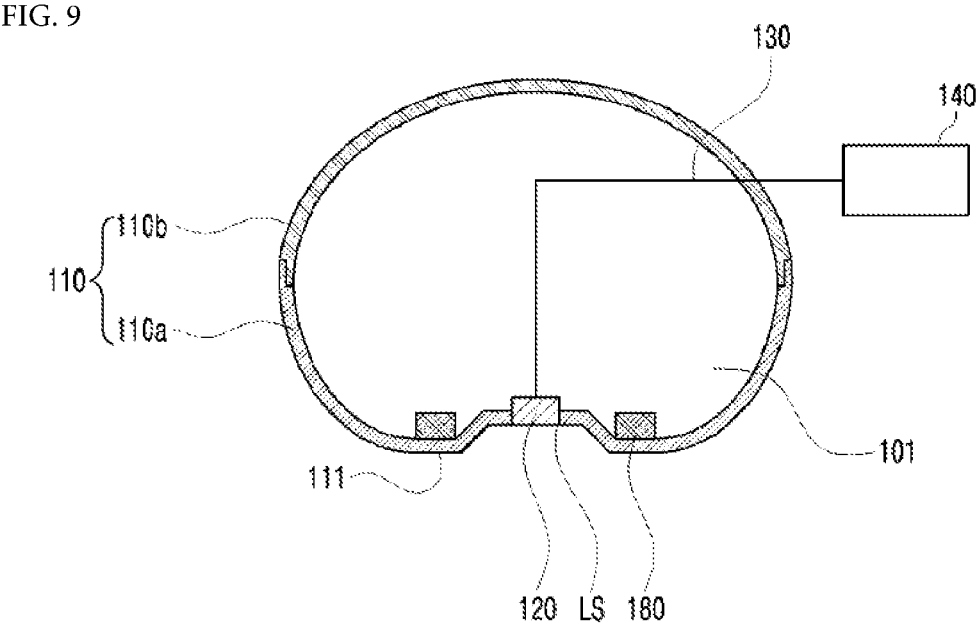

FIG. 9 to FIG. 11 are sectional views of water treatment devices according to other embodiments of the present disclosure.

Referring to FIG. 9 to FIG. 11, the main body 110 may have various shapes. A water treatment device of FIG. 9 includes a first piece 110a and a second piece which are pressed flat in a vertical direction. Here, the first piece 110a may be flat on a lower side thereof and the second piece 110b may be flat on an upper side thereof.

Although a water treatment device of FIG. 10 includes a main body 110 and a light source unit 120 which are substantially the same in shape as those of the water treatment device shown in FIG. 1 and FIG. 2, the water treatment device may further include a weight 180 disposed on a first piece 110*a*. The weight 180 allows the light source unit 120 to emit light in the direction of the water when the water treatment device is disposed on the water surface. The weight 180 is disposed inside the main body 110 such that, regardless of the shape of the main body 110, the water treatment device has a center of gravity at a location below half the height from the water surface to an uppermost portion of the main body 110 when the water treatment device is disposed on the water surface. With the weight 180 disposed on the first piece 110*a*, the first piece 110*a* always faces downwards when the water treatment device is disposed on the water surface, thereby allowing a light exit surface LS of the light source unit 120 to always face in the direction of the water. A water treatment device of FIG. 11 has a spherical shape and may further include a weight 180 disposed on a first piece 110*a*. In this way, even when the first piece 110*a* does not have a flat portion 111 on a lower side thereof, the first piece 110*a* can always face downwards under the influence of the weight 180 when the water treatment device is disposed on the water surface, thereby allowing a light exit surface LS of a light source unit 120 to stably face in the direction of the water at all times.

Although a separate weight 180 may be disposed in the main body 110 as in FIG. 10 or FIG. 11 in some embodiments, it will be understood that the present disclosure is not limited thereto. In other words, when there is another component having sufficient weight, such as the substrate of the light source unit 120, the component may be used in place of the weight 180.

FIG. 12 is a block diagram of a water treatment device according to one embodiment of the present disclosure. Referring to FIG. 12, the water treatment device according to this embodiment includes a light source unit 120 and a controller 140 controlling the light source unit 120. A power supply unit 170 is connected to the light source unit 120 and the controller 140 to supply power thereto. In particular, the power supply unit 170 may be directly connected to the light source unit 120, or may be connected to the light source unit 120 through the controller 140.

In one embodiment, the power supply unit 170 may be implemented in the form of an external power supply connected to the light source unit 120 and the controller 140 via an interconnect. In this case, the main body 110 may be formed at a portion thereof with a lead-out hole through which the interconnect is led out of the main body. However, it will be understood that the present disclosure is not limited thereto and the power supply unit 170 may be implemented in various other forms.

For example, in one embodiment, the power supply unit 170 may be implemented as a solar cell. When the power supply unit 170 is a solar cell, the solar cell may be disposed on an outer surface of the main body 110 at a location suitable for receiving sunlight. Alternatively, the solar cell may be disposed at another location spaced apart from the main body 110 and may supply power to the light source unit 120 in the interior 101 of the water treatment device via an interconnect 130. In this case, the main body 110 may be formed at a predetermined location thereof with a lead-out hole through which the interconnect 130 is led out of the main body.

In one embodiment, the power supply unit 170 may be a battery. When the power supply unit 170 is a battery, the battery may be of a detachable rechargeable type or a non-detachable disposable type. When the battery is used as the power supply unit, the battery may be disposed in the main body 110 in the vicinity of the light source unit 120. In this case, there is no need to lead an interconnect out of the main body 110.

Figure 13:
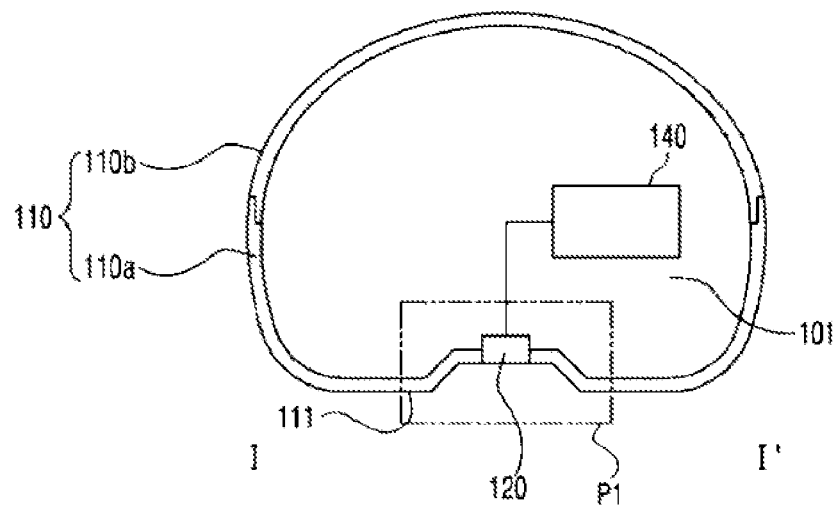
FIG. 13 is a sectional view of a water treatment device according to one embodiment, wherein a battery is used as a power supply unit.

FIG. 13 is a sectional view of a water treatment device according to one embodiment, wherein a battery is used as a power supply unit.

Referring to FIG. 13, the water treatment device according to this embodiment includes a light source unit 120 and a controller 140, which are disposed in an internal space 101 of the water treatment device. In this embodiment, besides the controller 140, a battery may also be disposed in the internal space 101 as a power supply unit supplying power to the controller 140 and the light source unit 120. In this case, the controller 140 may be integrally formed with the light source unit 120. The battery may be of a detachable type, particularly a rechargeable type. When the battery is of a rechargeable type, there is no need to provide an interconnect, which needs to be led out, thereby allowing the water treatment device to have a simpler structure.

Referring back to FIG. 12, when the power supply unit 170 is a solar cell or a battery, there is an advantage that the water treatment device can be readily used even in places where electricity is poor. In particular, when a solar cell is used as the power supply unit 170, the water treatment device can be conveniently used anywhere that can be reached by sunlight.

The power supply unit 170 is electrically connected to the light source unit 120 and the controller 140 to supply power to the light source unit 120 and the controller 140. Although the power supply unit 170 is shown as supplying power to the light source unit 120 through the controller 140 in FIG. 12, it will be understood that the present disclosure is not limited thereto and the power supply unit 170 may be directly connected to the light source unit 120 to supply power to the light source unit 120.

The water treatment device may further include an optical unit selectively focusing or diffusing light emitted from the light source unit 120. The optical unit may include at least one lens as necessary. When the lens downwardly transmits the light from the light source unit 120 therethrough, the lens may perform various functions such as focusing the light, dispersing the light, and increasing or decreasing uniformity of the light.

In one embodiment, the water treatment device may further include a sensor unit 150 detecting an external environment to control On/Off of the light source unit 120 according to various conditions. In one embodiment, the water treatment device may further include a sensor that detects the amount of water, tilting of the main body 110, or contact of the main body 110 with a water surface.

The sensor unit 150 is connected to the controller 140 and transmits a detected signal to the controller 140. The controller 140 controls On/Off of the light source unit 120, the intensity and duration of light emission from the light source unit 120, and the like, based on the signal received from the sensor unit 150.

In one embodiment, the sensor unit 150 may include multiple sensors, for example, a first sensor 151 and a second sensor 153.

In one embodiment, the first sensor 151 may be a detection sensor that detects a height from a bottom of a water storage tank to the water surface. The controller 140 may control the amount of the light emitted from the light source unit 120 based on information from the detection sensor. Specifically, the controller 140 may control On/Off of the light source unit 120 and/or the amount of the light emitted from the light source unit 120 based on comparison of the height from the bottom of the water storage tank to the water surface, which is received from the first sensor 51, with a preset value.

In one embodiment, the second sensor 153 may be either a tilting sensor that detects the degree of tilting of the main body 110 or a contact sensor that detects contact of the main body 110 with the water surface. Alternatively, the second sensor 153 may include both the tilting sensor and the contact sensor. The tilting sensor detects the degree of tilting of the water treatment device, such that the light source unit 120 is turned off when the main body 110 is tilted to a degree at which a light exit surface is visible to the human eye. The contact sensor detects contact of the main body 110 with the water based on detection of a minute change in current that occurs when the main body 110 contacts the water, such that the light source unit 120 is turned on when the main body 110 comes into contact the water. When the main body 110 is separated from the water, the light source unit 120 may be turned off. In this way, it is possible to protect human eyes and skin from harmful UV light.

The controller 140 may control the amount of the light emitted from the light source unit 120 based on the information from the tilting sensor. Specifically, the controller 140 may control On/Off of the light source unit 120 based on comparison of the degree of tilting of the main body 110 received from the second sensor 153 with a preset value. For example, when the main body 110 is tilted to an angle of 45 degrees or more, the water treatment device may be turned off.

Although the sensor unit is described as including the height detection sensor and the tilting sensor in this embodiment, it will be understood that the present disclosure is not limited thereto. In another embodiment, the sensor unit may include other types of sensors that detect various factors affecting whether to turn the light source unit 120 on or off.

Figure 14:
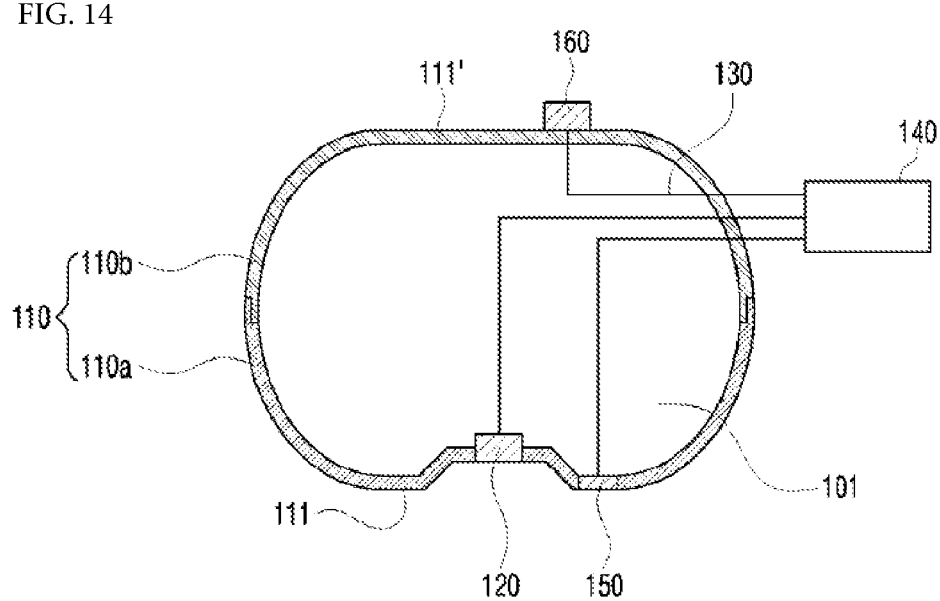
FIG. 14 is a sectional view of a water treatment device according to one embodiment of the present disclosure.

FIG. 14 is a sectional view of a water treatment device according to one embodiment of the present disclosure.

Referring to FIG. 14, the water treatment device according to this embodiment includes a main body 110, a light source unit 120 disposed in the main body 110, a detection sensor detecting a distance from a bottom surface of a water storage tank to the main body 110, and a display unit 160 displaying information about whether the light source unit 120 is in an On state or in an Off state, the intensity of the light emitted from the light source unit 120, how much time passed after the light source unit 120 is turned on, and the like.

The display unit 160 allows a user to check whether the light source unit 120 is in the On state or in the Off state. Since UV light is harmful to human eyes or skin, there is a need to prevent a person from being directly exposed to UV light while the light source unit 120 is turned on. Besides information as to whether the light source unit 120 is in the On state or in the Off state, the display unit 160 may also display the amount of the light emitted from the light source unit 120 and other specific settings for the light source unit 120. Such display contents may be set differently according to information that a user wants to know about.

Although some embodiments have been described herein, it should be understood that these embodiments are provided for illustration only and are not to be construed in any way as limiting the present disclosure, and that various modifications, changes, alterations, and equivalent embodiments can be made by those skilled in the art without departing from the spirit and scope of the disclosure.

Therefore, the scope of the present disclosure is not limited to the detailed description herein and should be defined only by the accompanying claims and equivalents thereto.

We claim:

1. A light emitting device comprising:
a main body disposed on a liquid surface forming a boundary between air and a liquid and movable vertically and laterally in response to movement of the liquid surface, the main body having a height measured between the liquid surface and an uppermost portion of the main body and having a center of gravity located below a middle of the height; and
a light source mounted on the main body and emitting light toward the liquid to treat the liquid,
wherein the light source comprises a light emitting diode comprising semiconductor layers doped with different conductivity types of dopants and an active layer interposed between the semiconductor layers,
wherein the main body has a first piece and a second piece that define an interior of the main body that is filled with a material having a lower specific gravity lower than water, the material allowing the light emitting device to be disposed on the liquid surface,
wherein the first piece has flat portions disposed at a lowermost location of the main body and contacting the liquid surface and the light source is disposed between the flat portions along a first direction parallel to the liquid surface, and
wherein the flat portions include regions disposed to be substantially symmetrical to each other with respect to the light source disposed between the flat portions and located at a position lower than the light source along a second direction perpendicular to the first direction.

2. The light emitting device according to claim 1, wherein the light source unit has a light exit surface through which the light exits from the light source unit, the light exit surface substantially parallel to the liquid surface.

3. The light emitting device according to claim 2, wherein the light exit surface of the light source directly contacts the liquid surface or contacts an air interposed between the liquid surface and the light exit surface.

4. The light emitting device according to claim 1, wherein the main body comprises an outer wall.

5. The light emitting device according to claim 4, wherein the first piece is disposed closer to the liquid surface than the second piece.

6. The light emitting device according to claim 1, further comprising:
a weight disposed inside the main body and configured to allow the light emitting diode to emit light toward the liquid.

7. The light emitting device according to claim 6, wherein the light source includes a substrate on which the light emitting diode is disposed, the substrate configured to apply a weight to the main body.

8. The light emitting device according to claim 6, wherein the weight is disposed on the first piece.

9. The light emitting device according to claim 1, wherein the flat portion is substantially parallel to the liquid surface.

10. The light emitting device according to claim 1, further comprises:
a controller controlling an amount of the light emitted from the light emitting diode, and
a sensor connected to the controller, the sensor comprising at least one of a first sensor detecting an amount of the water and a second sensor detecting tilting of the main body or contact of the main body with the water.

11. The light emitting device according to claim 10, wherein:
the water is contained in a water storage tank;
the first sensor is a detection sensor configured to detect a height from a bottom surface of the water storage tank to the liquid surface; and
the controller is configured to control the amount of the light emitted from the light source based on information from the detection sensor.

12. The light emitting device according to claim 10, wherein:
the second sensor is a tilting sensor detecting a degree of tilting of the main body; and
the controller is configured to turn on or off the light source based on the degree of tilting of the main body.

13. The light emitting device according to claim 1, wherein the light source further comprises:
a substrate on which the light emitting diode is mounted; and
a transmissive window transmitting the light emitted from the light emitting diode therethrough, the transmissive window forming a light exit surface through which the light exits from the light source.

14. The light emitting device according to claim 1, further comprising:
a power supply supplying power to the light source, the power supply being a solar cell or a battery.

15. A light emitting device comprising:
a main body disposed on a surface forming a boundary between air and a liquid, the main body having a specific gravity lower than the liquid; and
a light source mounted on the main body and emitting light toward the liquid to treat the liquid,
wherein the light source comprises a light emitting diode comprising semiconductor layers doped with different conductivity types of dopants and an active layer interposed between the semiconductor layers,
wherein the main body has a first piece and a second piece that define an interior of the main body that is filled with a material having a lower specific gravity lower than water, the material allowing the light emitting device to be disposed on the surface,
wherein the first piece has flat portions disposed at a lowermost location of the main body and contacting the surface and the light source is disposed between the flat portions along a direction parallel to the surface, and
wherein the flat portions include regions disposed to be substantially symmetrical to each other with respect to the light source disposed between the flat portions and located at a position lower than the light source along a second direction perpendicular to the first direction.

16. The light emitting device according to claim 15, wherein the main body has a height measured between the surface and an uppermost portion of the main body and having a center of gravity located below a middle of the height.

17. The light emitting device according to claim 15, further comprising:
a controller controlling an amount of the light emitted from the light emitting diode;
a display unit connected to the controller and displaying whether the light source unit is turned on or off; and
a power supply unit supplying power to the light source, the power supply being a solar cell or a battery.

18. The light emitting device according to claim 15, wherein the main body comprises an outer wall.

19. The light emitting device according to claim 15, further comprising:
a sensor unit comprising at least one of a first sensor detecting an amount of the water and a second sensor detecting tilting of the main body or contact of the main body with the water.

20. The light emitting device according to claim 15, wherein the light source further comprises a transmissive window transmitting the light emitted from the light emitting diode therethrough, the transmissive window forming a light exit surface through which the light exits from the light source.

* * * * *